United States Patent [19]

Jorgensen-Dahl

[11] 4,453,330
[45] Jun. 12, 1984

[54] APPARATUS FOR HAULING IN AND WINDING UP A FISHING LINE WITH ATTACHED SNELLS

[76] Inventor: Jorgen Jorgensen-Dahl, Solvangen 32, 2013 Skjetten, Norway

[21] Appl. No.: 380,128

[22] Filed: May 20, 1982

[51] Int. Cl.³ .................... A01K 91/00; A01K 79/00
[52] U.S. Cl. .............................. 43/6.5; 43/27.4; 43/57.3
[58] Field of Search ............... 43/4, 5, 6.5, 27.4, 43/57.3

[56] References Cited

U.S. PATENT DOCUMENTS

| | | | |
|---|---|---|---|
| 3,841,011 | 10/1974 | Tison | 43/4 |
| 3,903,632 | 9/1975 | Tison | 43/6.5 |
| 4,107,865 | 8/1978 | Alex | 43/27.4 |

FOREIGN PATENT DOCUMENTS 104806 8/1964 Norway.

Primary Examiner—Nicholas P. Godici
Assistant Examiner—Marc Hodak
Attorney, Agent, or Firm—Abelman, Frayne, Rezac & Schwab

[57] ABSTRACT

An assembly on an apparatus for hauling in and winding up a fishing line with attached snells and hooks, comprising a hook aligner, a hook guide and a driven drum with hook magazines provided on one of the drum flanges. The hook guide comprises a hook holder which is slidably disposed on a rail or the like and which, by overcoming a counterforce from, e.g., a tension spring, is moved along the rail by the snell, one end of said rail being pivotally mounted and the other end being arranged for movement from a hook-receiver position to a hook-delivery position, the assembly also including a pulley arranged in the vicinity of the pivot point of the rail for guiding the line back to, so that it may be coiled on, the drum, the snell drawing the hook holder along with it in the direction of the pulley and during this being held taut, further that the snell after having passed around the pulley permits the hook holder to be pulled back along the rail by the tension spring, said rail during the to-and-fro movement of the hook holder pivoting toward the periphery of the drum flange, where one of the hook trapping means provided on the margin of the drum flange guides the hook onto one of the hook magazines.

3 Claims, 2 Drawing Figures

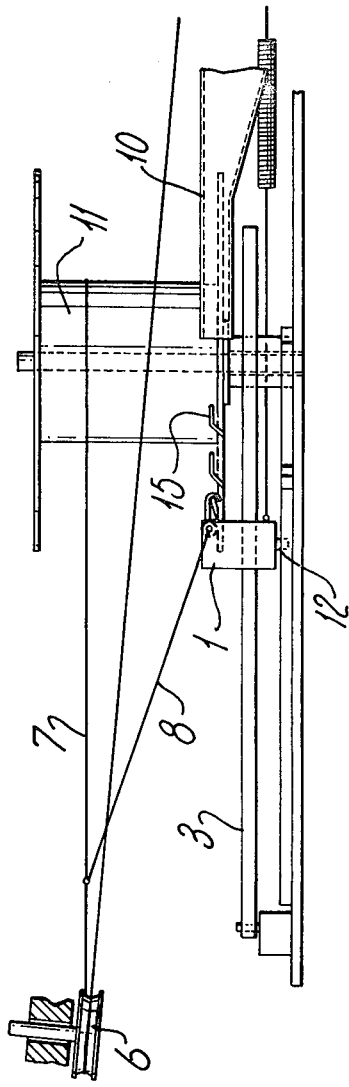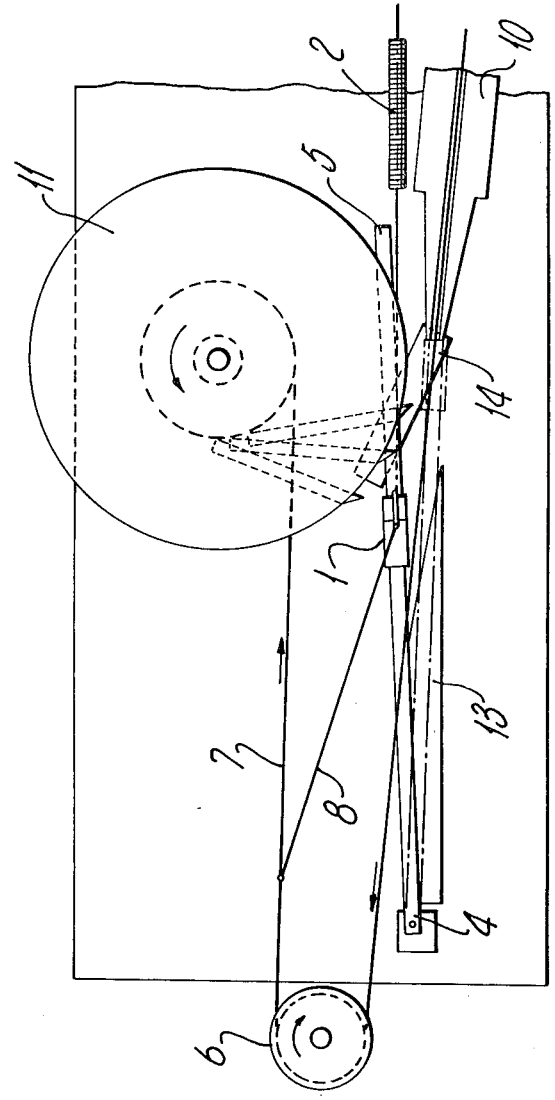

APPARATUS FOR HAULING IN AND WINDING UP A FISHING LINE WITH ATTACHED SNELLS

The present invention relates to an assembly on an apparatus for hauling in and coiling up a fishing line with attached snells and hooks.

The traditional way of fishing with lines in Norway has been to bait the lines manually, store them in tubs, and set the lines in the sea directly from the tubs.

This way of fishing, however, can no longer be practiced today, as it requires both too much time and too many personnel, and thus is much to expensive.

Therefore, especially in the past twenty years or so, a number of attempts have been made to automate both the baiting and setting of fishing lines, as well as their retrieval.

Norwegian Pat. No. 104.806, for example, describes an apparatus for setting and hauling in fishing lines, the assembly comprising a reel or drum for winding and unwinding the line as it is being pulled in and set out, respectively, wherein hook magazines are provided, evenly distributed about the circumference of the reel, which are intended to receive the hooks as the line is hauled in and wound around the reel, and wherein the line, prior to passing onto the winding means, passes a set of brushes which serve to clean the hooks and straighten out the snells. In addition, this patent describes special means for controlling the line and attached hooks in such manner that the hooks are brought into the correct position in relation to the hook magazine.

Norwegian Pat. No. 129.074 also describes a means for continuous preparation of hook-carrying snells on a fishing line.

Norwegian Pat. No. 127.086 describes a method for unwinding entangled hook-carrying snells on a fishing line by means of a rotating magnetic field.

The assemblies in the prior art have not found wide practical application, for the reason that they either are unnecessarily complicated, are not reliable enough, require too many personnel or too much space, or are too expensive.

It is the object of the present invention to rectify the drawbacks of the prior art, and the invention thus comprises an assembly on an apparatus for hauling in and winding up a fishing line with snells and hooks mounted thereon, comprising a hook aligner, a hook guide and a driven coiling drum with hook magazines provided on one of the drum flanges, and the assembly is characterized in that the hook guide comprises a hook holder which is slidably disposed on a rail or the like and which by overcoming a counterforce from, e.g., a tension spring, is drawn along the rail by the snell, one end of said rail being pivotally mounted and the other end being arranged for movement from a hook-receiver position to a hook-delivery position, a pulley arranged in the vicinity of the pivot point of the rail for guiding the line back to, so that it may be coiled on, the winding drum which is arranged adjacent the hook aligner, the snell drawing the hook holder along in the direction of the pulley and being held taut during this, further that the snell after having passed around the pulley permits the hook holder to be pulled back along the rail by the tension spring, the rail during the to-and-fro movement of the hook holder being pivoted toward the periphery of the drum flange, where one of the hook trap means provided at the margin of the flange guides the hook onto one of the hook magazines.

The invention will be further illustrated by the accompanying drawings, wherein

FIG. 1 is a schematic view of the assembly of the invention, in side view, and

FIG. 2 shows the same assembly seen from above.

When the fishing line is being hauled in, the fish are taken off the hooks and the line passes first through a washing bin (not illustrated). In the latter, the hooks are captured and are pulled by means of the line 7 which passes over a pulley 6 into a hook aligner 10.

In a manner known per se, the hook is then oriented with the tip downward.

Following such orientation, the hook is drawn into a hook guide with a spring-loaded hook holder 1. The hook holder slides on a rail 3 which can be pivoted in the horizontal plane about a point 4 adjacent the end of the rail that is located downstream in the assembly in relation to the direction of movement of the line as it is being hauled in.

As the point of attachment of the snell 8 to the fishing line 7 passes over the pulley 6, the snell passes beneath the pulley. To ensure that this occurs in a satisfactory manner, the lower flange of the pulley is provided with grooves which capture the snell when the snell forms an angle relative to the pulley.

After having passed around the pulley, the line is wound onto a vertically-disposed drum 11. At this point in time, the point of attachment for the snell to the line has passed the pulley and the spring-loaded hook holder 1 guides the hook with the snell held taut toward the lower flange of the drum, which in a manner known per se is provided with hook magazines.

At the same time as the point of attachment for the snell on the line is guided toward, or perhaps is located at, the pulley, the rail pivots from the hook-receiver position 13 (shown in phantom in FIG. 2) in alignment with the hook aligner 10 into a hook-delivery position 5 for transferring the hook to the hook magazines in the lower flange of the drum.

Here, the rail is locked by means of a locking mechanism until the hook has been captured by saw-tooth-like hook trap means 15 at the outer end of the hook magazines.

The hook holder thus stops at a definite point and at such an angle that the trapping means on the hook magazine can easily pluck the hook out of the hook holder. This is obtained in that the hook holder is provided with a guide pin 12 on the underside thereof which follows a groove or a cam 14 in a fixed plate underneath it and thus pivots the rail in the manner indicated above.

Owing to the angle of the hook magazine in relation to the radius of the drum flange, the hook is drawn inwardly in the magazine.

By means of a suitable release mechanism for the rail, the latter, owing to the hook holder's being retracted by means of a spring bias 2, will pivot back into the hook-receiver position at the same time as the hook holder slides back into the starting position in front of the hook aligner.

With the assembly of the invention, because everything is "folded double", one obtains a great saving of space, which is of great importance because it allows the assembly of the invention to be installed even on fishing boats which heretofore have been too small to accomodate such automated equipment.

The assembly of the invention is not complicated, which renders it reasonable in cost and also reliable in operation, and it is in addition easy to operate, thus requiring fewer personnel.

In conjunction with a suitable baiting device, the invention enables a fishing boat to operate with substantially fewer personnel, thus permitting much higher efficiency and a much more economic fishing operation.

Having described my invention, I claim:

1. An assembly on an apparatus for hauling in and winding up a fishing line with attached snells and hooks, comprising a hook aligner, a hook guide and a driven drum with hook magazines and hook trapping means provided on one of the drum flanges, characterized in that the hook guide comprises a hook holder which is slidably disposed on a rail and which is spring biased opposite to the direction of the incoming line, one end of said rail being pivotally mounted and the other end being arranged for movement from a hook-receiver position to a hook-delivery position, the assembly also including a pulley arranged in the vicinity of the pivot point of the rail for guiding the line back, so that it may be coiled on the drum, the snell drawing the hook holder along with it in the direction of the incoming line and during this being held taut, further that the snell after having passed around the pulley permits the hook holder to be pulled back along the rail by the spring bias, said rail during the to-and-fro movement of the hook holder pivoting toward the periphery of the drum flange, where one of the hook trapping means provided on the margin of the drum flange guides the hook onto one of the hook magazines.

2. An assembly according to claim 1, characterized in that the hook holder has a guide pin for cooperation with a guide in the form of a groove or cams in the frame of the line-hauling mechanism, for pivoting the rail from the hook-receiver position into the hook-delivery position during the movement of the hook holder away from the hook aligner.

3. An assembly according to claim 2, characterized in that the guide comprises a groove or a cam which cooperates with the guide pin on the hook holder, formed so that when the hook has been delivered, the hook holder travels further along the rail to its hook-receiver position, causing the rail to pivot back to its receiver position, so that the hook holder is ready to capture the next hook.

* * * * *